United States Patent [19]
Sakai et al.

[11] Patent Number: 4,768,033
[45] Date of Patent: Aug. 30, 1988

[54] CALLSIGN DISPLAY FOR TRANSCEIVER

[75] Inventors: Shigeru Sakai; Kazunori Kudo, both of Tokyo, Japan

[73] Assignee: Trio Kabushiki Kaisha, Japan

[21] Appl. No.: 97,730

[22] Filed: Sep. 17, 1987

Related U.S. Application Data

[63] Continuation of Ser. No. 744,574, Jun. 14, 1985, abandoned.

[30] Foreign Application Priority Data

| Jun. 16, 1984 | [JP] | Japan | 59-122946 |
| Jun. 16, 1984 | [JP] | Japan | 59-88858[U] |
| Jun. 20, 1984 | [JP] | Japan | 59-90800[U] |

[51] Int. Cl.⁴ .......................... H04B 7/26; H04Q 7/00
[52] U.S. Cl. .................................. 340/825.440; 455/31
[58] Field of Search ................ 340/825.44, 311.1, 539, 340/298, 825.04; 455/31, 34, 57, 70, 77, 88, 89, 158

[56] References Cited

U.S. PATENT DOCUMENTS

| 3,866,206 | 2/1975 | DeGiorgio et al. | 340/298 |
| 4,172,969 | 10/1979 | Levine et al. | 340/825.44 |
| 4,208,630 | 6/1980 | Martinez | 340/825.44 |
| 4,259,664 | 3/1981 | Boisclair | 340/539 |
| 4,264,979 | 4/1981 | Gutowski | 455/89 |
| 4,392,135 | 7/1983 | Ohyagi | 340/825.44 |
| 4,392,246 | 7/1983 | Niioka et al. | 455/158 |

FOREIGN PATENT DOCUMENTS

| 0141839 | 8/1984 | Japan | 340/825.44 |
| 2149164 | 6/1985 | United Kingdom | 340/825.44 |

OTHER PUBLICATIONS

"Personal Radio", JAS Journal, May 1983, pp. 37–41 and translation.

Primary Examiner—Donald J. Yusko
Attorney, Agent, or Firm—Gerald J. Ferguson, Jr.

[57] ABSTRACT

A callsign display device for a transceiver which receives a radio wave carrying a coded digital signal of a data including a callsign for amature wireless radio communication. The callsign display device includes a display circuit for displaying the callsign by decoding the data including the callsign.

9 Claims, 8 Drawing Sheets

FIG. 7A

CALLSIGN DISPLAY FOR TRANSCEIVER

This application is a continuation of Ser. No. 744,574 filed June 14, 1985, now abandoned.

BACKGROUND OF THE INVENTION

1. Field of the Invention

The present invention relates to a callsign display device for a wireless transceiver used by an amateur radio operator, wherein the callsign is displayed by receiving Hagelbarger-coding data including callsign data.

2. Related Application

This application is related to co-pending U.S. application Ser. No. 830,583 filed Feb. 2, 1986. In wireless transceivers for use by amateur radio operators, a communication method is disclosed in the above co-pending application of the type where data including at least idle channel frequency data and callsign data is subjected to Hagelbarger-coding and its transmitted signal together with a frame sync signal is received at a receiver site to make the transceiver tune in the idle channel frequency.

3. Description of the Prior Art

Transceivers applicable to the present invention may be a frequency-synthesizer type transceiver disclosed in U.S. Pat. No. 4,097,805, for example. Transceivers capable of displaying a channel frequency as disclosed in U.S. Pat. No. 30,949 is already known, however, none of the prior art transceivers can display a callsign as with the present invention. The disclosure of U.S. Pat. No. 3,227,999 is herein incorporated for reference to the Hagelbarger-coding technique.

SUMMARY OF THE INVENTION

It is an object of the present invention to provide a callsign display device for an amateur wireless transceiver of the type described above, which can display the callsign of another party each time transmitted radio signals including the callsign data are received.

Another object of the present invention is to provide a callsign display device in which callsign data is outputted in the form of serial data so that the time and callsign can be displayed or printed out by using such as personal computers.

It is a further object of the present invention to provide a callsign display device which can store in a storage device the callsigns of other parties with whom communication have been had. This is convenient in that after transceivers have been used as mobile transceivers the callsigns of the communication parties can be fetched from the storage device to fill them in a log or the like.

DESCRIPTION OF THE EMBODIMENT

Figure 1:
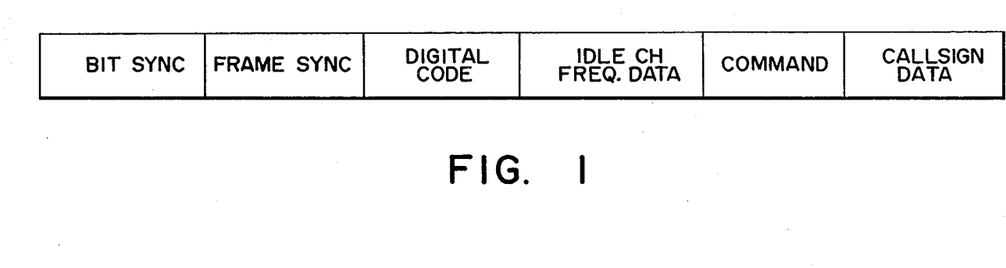
FIG. 1 shows an example of a transmitted data by the transceiver embodying the present invention.

First, one example of the arrangement of transmitted data will be explained with reference to FIG. 1 showing the format of the transmitted data. The format is composed of; bit sync data (50 bits); frame sync data (15 bits); digital code of BCD 5 digits corresponding to group code data or the like (20 bits); idle channel frequency data of BCD 6 digits (24 bits); command (8 bits); and callsign data of 6 characters ASCII code (48 bits). Of the above, 100 bits including from the digital code to the callsign data are Hagelbarger-coded which in turn are transferred as data of 212 bits in total including alternate check bits and data bits, as particularly shown in FIG. 2. The data is transmitted in the form of MSK (minimum shift keying) signal at a data transference speed of 1200 B.P.S.

The following embodiment is directed to displaying the callsign included in such data as described above.

Figure 3:
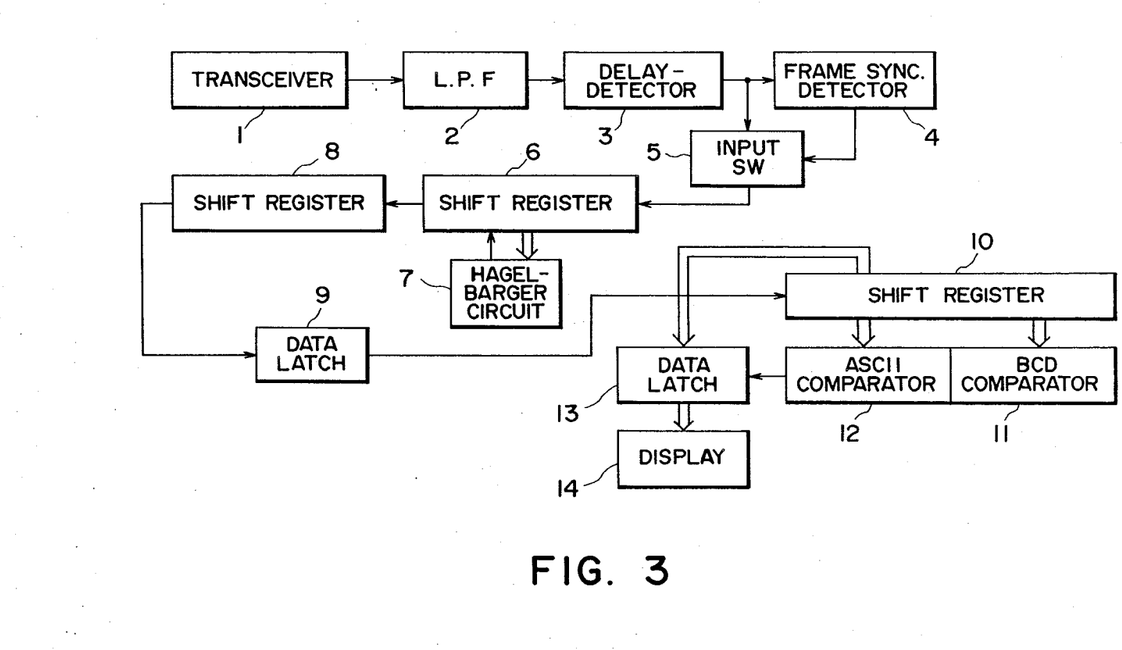
FIG. 3 is a block diagram showing the arrangement for performing a first function according to the present invention.

FIG. 3 is a block diagram of the circuit arrangement regarding a first function according to the present invention.

Figure 2:
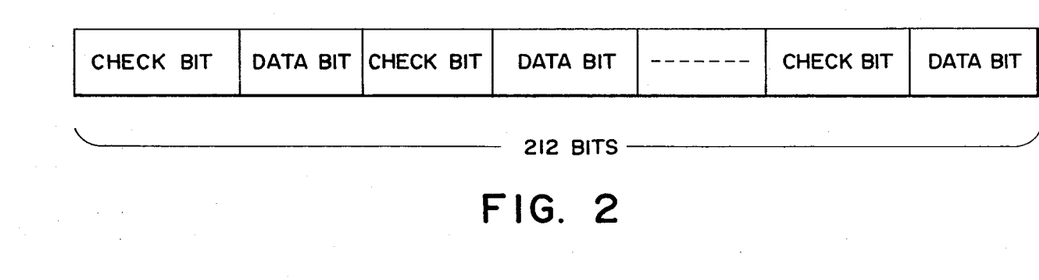
FIG. 2 is a format of a transmitted data including callsign data.

Data shown in FIG. 2 is received by an amateur wireless transceiver 1 and is MSK-demodulated. Thereafter, the data is supplied through a low-pass filter 2 to a delay-detector circuit 3 to detect the supplied data. The detected output from the delay-detector circuit 3 is supplied to a frame sync data detector circuit 4 to judge whether the detected output is a frame sync data or not based upon the pattern of the frame sync data pattern in concern. The detected output from the frame sync data detector circuit 4 is supplied to an input switching circuit 5. The output following the frame sync data from the delay-detector circuit 3 is supplied to a shift register 6 of 212 bits. Data composed of the predetermined number of bits in the shift register 6 is then supplied to a Hagelbarger demodulator circuit 7 for correction of error. The output from the shift register 6 is supplied to a shift register 8 which thus stores the error-corrected data. The output from the shift register 8 is supplied to a data latch circuit 9 which latches only the data bits of the output from the shift register 8. The data bits are supplied to a shift register 10 of 100 bits. Consequently, the shift register 10 stores the digital code, idle channel frequency data, command, and callsign data corresponding to the lower 48 bits. The callsign data in the shift register 10 is supplied in parallel to a data latch circuit 13 to latch the callsign data. The latch output from the latch circuit 13 is displayed on a display 14 provided with a decoder for decoding the callsign code into a particular callsign.

The data latch circuit 13 is supplied with strobe pulses as of the detection outputs from both BCD comparator circuit 11 and ASCII comparator circuit 12. The BCD comparator circuit 11 is supplied with each group of respective 4 bits in the higher 52 bits of the shift register 10 and detects if the respective 4 bits are any one of 0 to 9 in BCD notation. If the 4 bits represent a BCD data, then the circuit 11 delivers a detection output as a strobe pulse for the latch circuit 13. Similarly, the ASCII comparator circuit 12 is supplied with each group of respective 8 bits in the lower 48 bits of the shift register 10 and detects if the respective 8 bits are any one of 0 to 9, through A to Z for the ASCII code. If the 8 bits represent an ASCII code data, then the circuit 12 delivers a detection output as a strobe pulse for the latch circuit 13.

Figure 4:
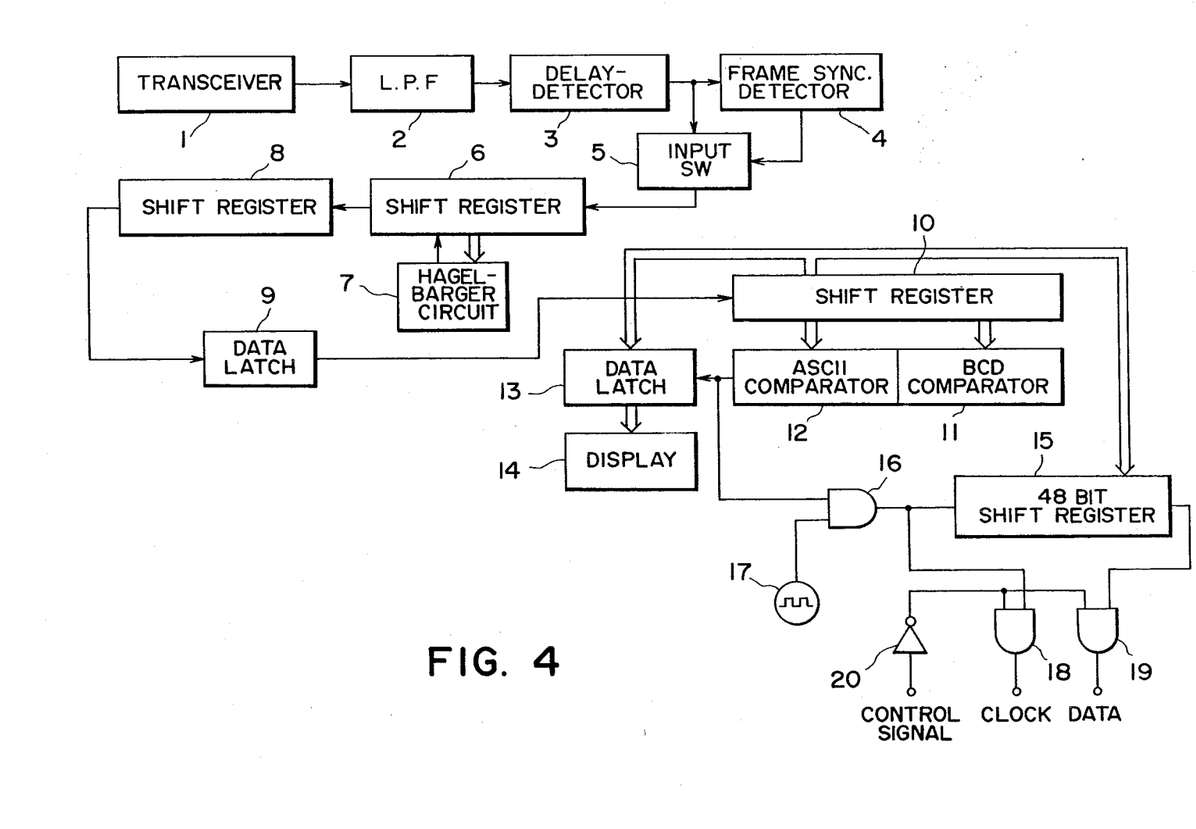
FIG. 4 is a block diagram showing the arrangement for performing a second function according to the present invention.

FIG. 4 is a block diagram of the circuit arrangement concerning a second function according to the present invention.

In addition to the circuit arrangement shown in FIG. 3, the data inputted to the data latch circuit 13 is further loaded as a parallel data in a shift register 15 of 48 bits.

The strobe pulses to the data latch circuit 13 are also supplied to one input terminal of an AND gate 16 of which the other input terminal is supplied with output pulses from a clock pulse generator 17. The output pulse from the AND gate 16 is supplied to the shift register 15 as a shift pulse and also supplied to one input terminal of an AND gate 18. The output data from the shift register 15 is supplied to one input terminal of an AND gate 19, while the other input terminals of the AND gates 18 and 19 are supplied with a control signal via an inverter 20 so as to control both AND gates 18 and 19.

Figure 5:
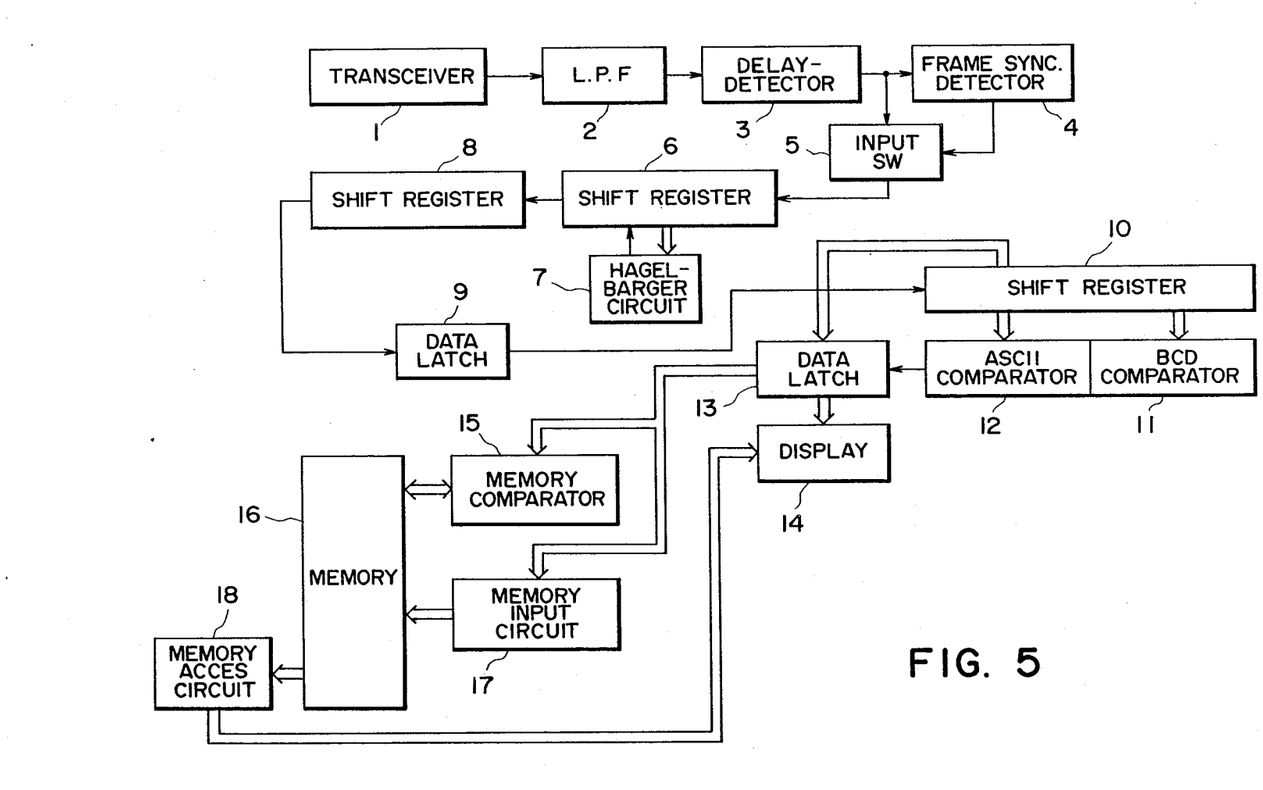
FIG. 5 is a block diagram showing the arrangement for performing a third function according to the present invention.

FIG. 5 is a block diagram of the circuit arrangement regarding a third function according to the present invention.

In addition to the circuit arrangement shown in FIG. 3, the latch output from the data latch circuit 13 is also supplied to a memory comparator circuit 15 which renders the latch output store in a memory 16 upon detecting that the callsign data stored in the memory 16 does not coincide with the latch output from the data latch circuit 13. Furthermore, the latch output from the data latch circuit 13 is also supplied to a memory input circuit 17 which renders the latch output store in the memory 16 only when the circuit 17 is instructed to perform such operation. The data stored in the memory 16, that is, the callsign data, is arranged to be read out via a memory access circuit 18 and supplied to display the data on the display 14.

Figures 6, 6A:
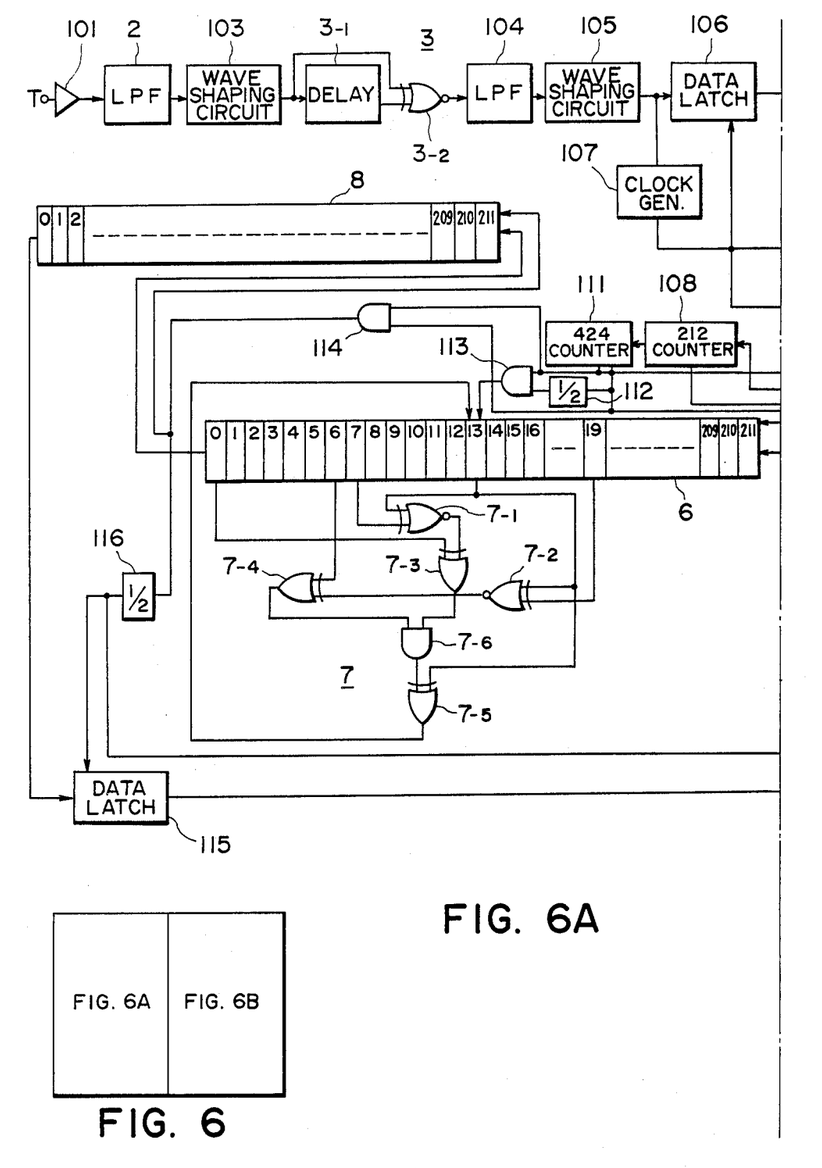
FIGS. 6, 6a, 6b; and 7, 7a, 7b are circuit diagrams showing an embodiment of the present invention.
Figure 6B:
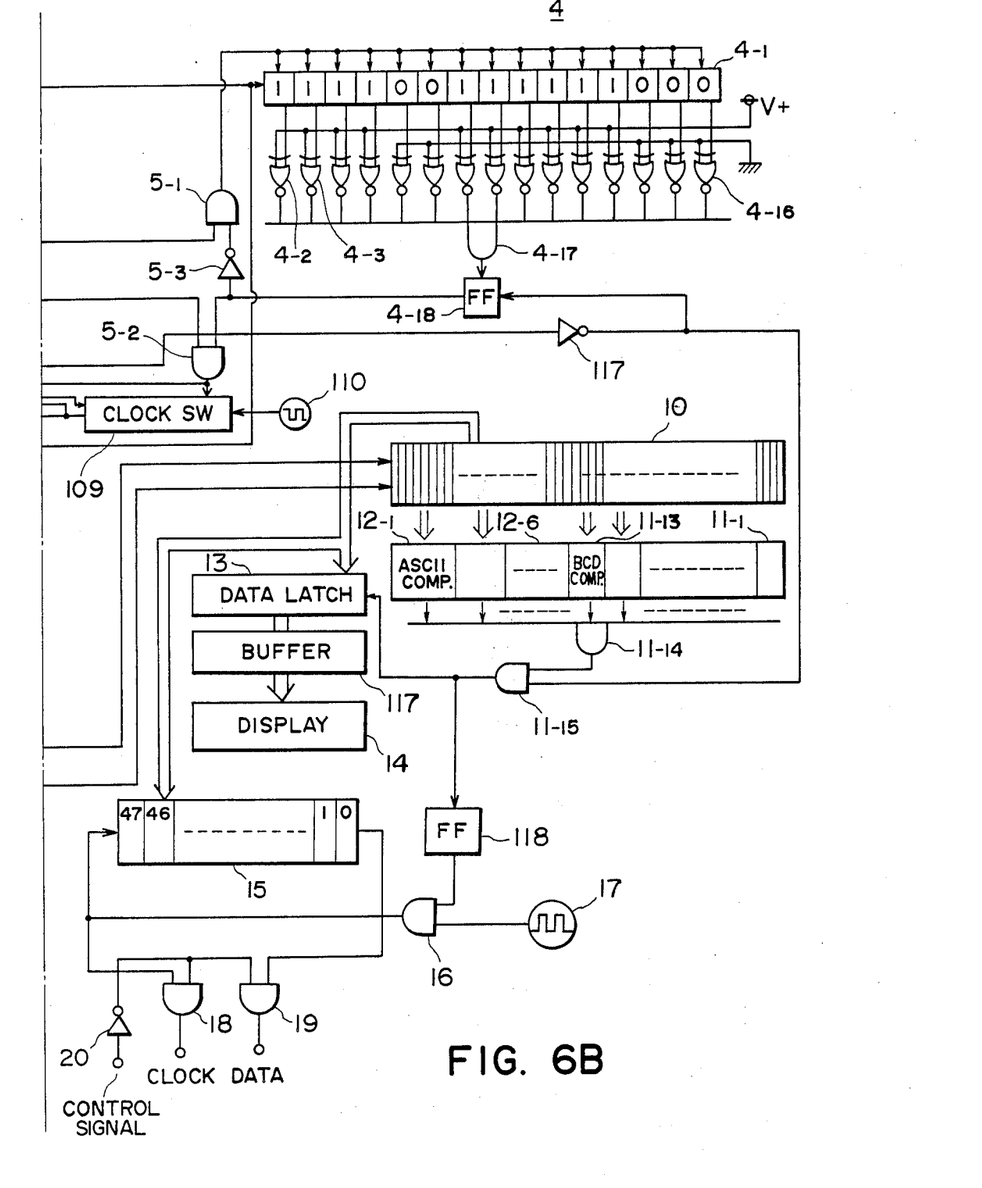
Figures 7, 7B:
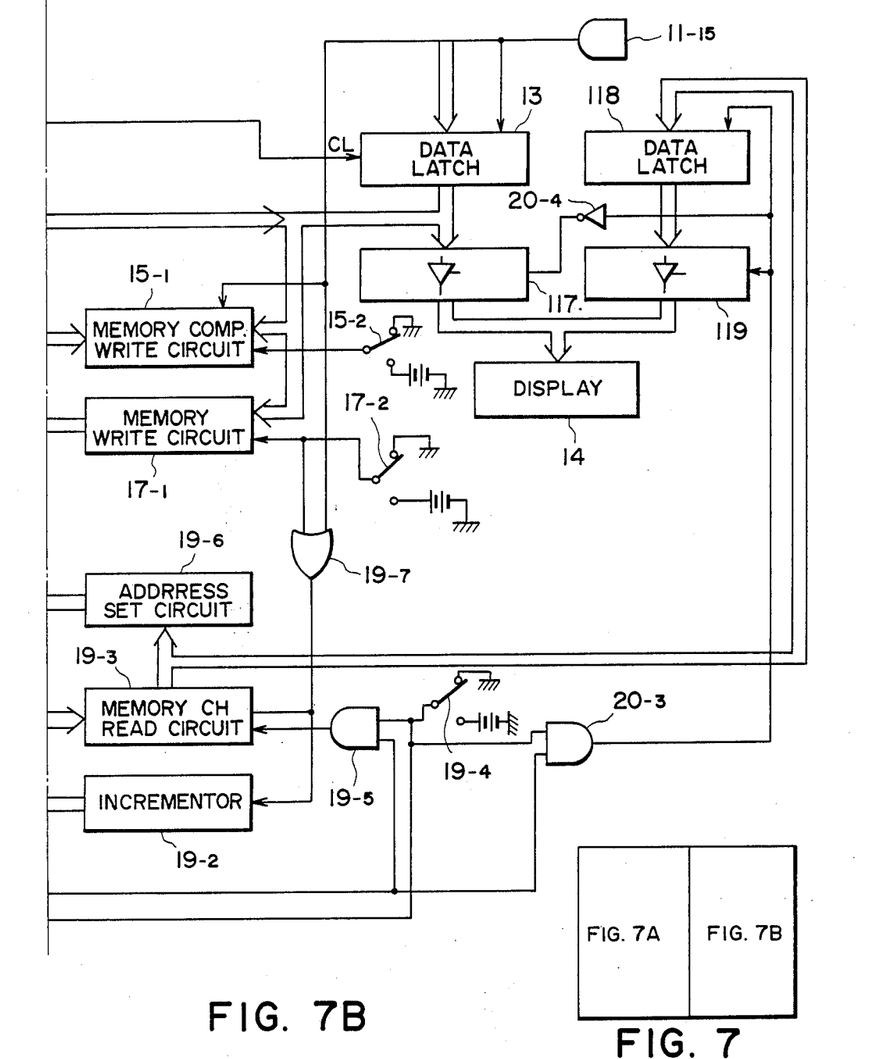
Figure 7A:
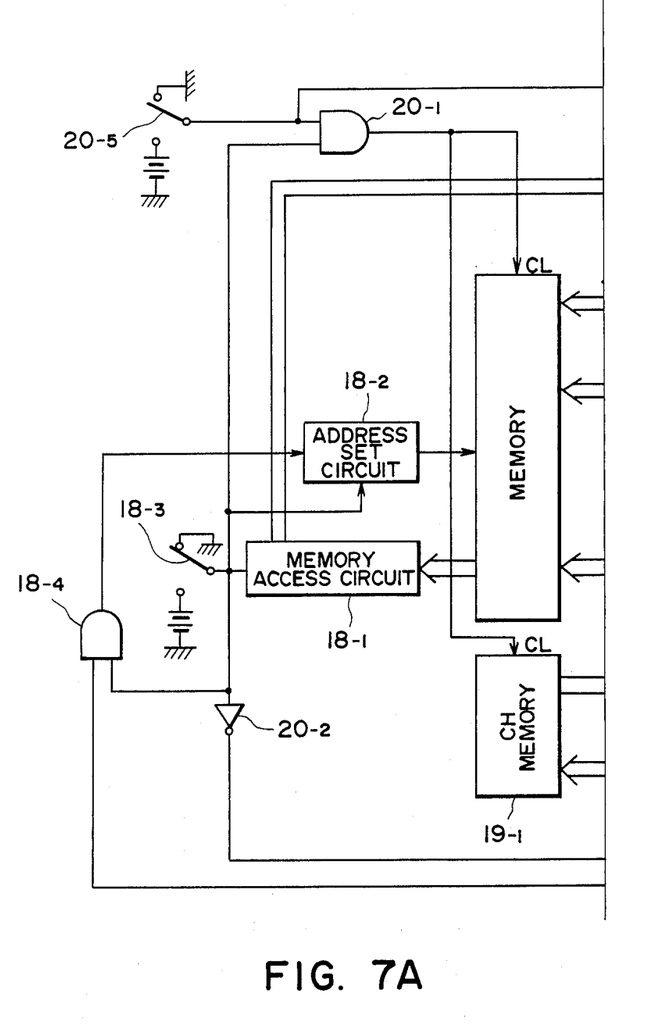

FIGS. 6 and 7 are particular circuit diagrams for practicing the above functions of the present invention.

Transmitted data is demodulated in accordance with the way the data modulated at the transmitter site, e.g., MSK signals are demodulated at the armature wireless transceiver and supplied to an external loud speaker terminal T of the receiver. The supplied data is amplified at an amplifier 101 and fed to a wave shaping circuit 103 via a low-pass filter 2 for wave-shaping the fed data. The wave-shaped data is supplied to a delay detector circuit 3 for delay-detecting the wave-shaped data. The delay detector circuit 3 comprises a delay circuit 301 for delaying the data by one bit time and an Exclusive-OR circuit (EX-OR) 3-2 for inputting the outputs from the delay circuit 301 and the wave shaping circuit 103. The output from the delay detector circuit 3 is wave-shaped by supplying the output through a low-pass filter 104 to a wave shaping circuit 105. The output from the wave shaping circuit 105 is supplied to a latch circuit 106 for latching the output from the wave shaping circuit 105 and also to a clock pulse generator circuit 107 for generating clock pulses of 1200 Hz synchronizing in phase with the data transference speed. The output clock pulse from the clock pulse generator 107 is fed as a strobe pulse to a data latch circuit 106.

The output from the data latch circuit 106 is supplied to a frame sync data detector circuit 4, which comprises a shift register 401 of 15 bits; Exclusive-OR circuits (EX-OR) 4-2 to 4-16 each circuit being inputted at its one input terminal with each bit of the shift register 401; an AND gate 4-17 of which one input terminal is supplied with the outputs from the Exclusive-OR circuits 4-2 to 4-16; and a flip-flop circuit 4-18 which is set by the output from the AND gate 4-17. The other input terminals of the Exclusive-OR circuits 4-2 to 4-5 and 4-8 to 4-13 are applied with +V voltage, while the other input terminals of the Exclusive-OR circuits 4-6, 4-7, 4-14 to 4-16 are applied with ground potential voltage. This configuration, of course, corresponds to the bit pattern of the frame sync data.

The latch output from the data latch circuit 106 is supplied to a shift register 6 of 212 bits. The output clock pulse from the clock pulse generator circuit 107 is supplied to one input terminals of AND gates 5-1 and 5-2, while the other input terminal of the AND gate 5-1 is supplied with the output from the flip-flop 4-18 via an inverter 5-3, and the other input terminal of the AND gate 5-2 with the output from the flip-flop 4-18. The output from the AND gate 5-1 is supplied as a shift pulse to the shift register 4-1, while the output from the AND gate 5-2 is supplied to a 212 counter 108 and to the shift register 6 via a clock switching circuit 109 as a shift pulse.

The clock switching circuit 109 is supplied as a switching signal with the count-up output from the counter 108. Thus, the output pulse from a clock pulse generator 110, instead of the output from the counter 108, is supplied as a shift pulse to the shift register 6 in response to the switching signal. The frequency of the output pulse of the clock pulse generator 110 is set higher than the frequency of the output clock pulse of the clock pulse generator circuit 107.

A 424 counter 111 counts the shift pulses to the shift register 6 in response to the count-up output from the counter 108. The shift pulse to the shift register 6 is supplied via a frequency divider 112 of a division ratio 2 to an AND gate 113 or directly to an AND gate 114. The output from the counter 111, indicative of the preceding stage of "424" count-up of the counter 111, is supplied to the AND gates 113 and 114 so as to control their opening and closing. Such output from the counter 111 is also supplied through an inverter 117 to an AND gate 11-15 described later.

A Hagelbarger demodulator circuit 7 comprises Exclusive-OR circuits (EX-OR) 7-1 and 7-2, Exclusive-OR circuits (EX-OR) 7-3 to 7-5, and an AND gate 7-6. The output from the Exclusive-OR circuit 7-5 is written in the 14th bit of the shift register 6 in response to the output from the AND gate 113 to thereby effect error correction.

The output from the shift register 6 is supplied to a shift register 8 of 212 bits of which the output data is supplied to a data latch circuit 115 to latch the output data. The output from the AND gate 114 is supplied as a shift pulse to the shift register 8 and supplied as a strobe pulse to the data latch circuit 115 via a frequency divider with a division ratio 2.

The latch output from the data latch circuit 115 is supplied to a shift register 10 of 100 bits, while the output pulse from the frequency divider 116 is supplied as a shift pulse to the shift register 10. Each bit of the shift register 10 is supplied to BCD comparator circuits 11-1 to 11-13 and ASCII comparator circuits 12-1 to 12-6, so that the data contained in the shift register 10 is detected whether it is a BCD data or ASCII data. The output from the AND gate 11-15 is supplied to an AND gate 11-15.

The lower 48 bits of the shift register 10 are supplied to and latched at a data latch circuit 13 from which the output is supplied to a display 14 for displaying a callsign. The output from the AND gate 11-15 is supplied as a strobe pulse to the data latch circuit 13.

As described previously, the data inputted to the data latch circuit 13 is also supplied to and loaded in a shift register 15 of 48 bits.

The output from the AND gate 11-15 is supplied as a set pulse to a flip-flop 118 from which the output is supplied to an AND gate 16 to control it. The AND gate 16 is also supplied with the output from a clock pulse generator 17 operating at 3600 Hz, for example. The output from the AND gate 16 is supplied as a shift pulse to a shift register 15 and to an AND gate 18. The output pulse from the shift register 15 is supplied to an AND gate 19. A control signal via an inverter 20 is supplied to both AND gates 18 and 19 to control their opening and closing.

To write the data in a memory 16 as particularly shown in FIG. 7, there are provided a memory comparator write circuit 15-1 and a write instruction switch 15-2; a memory write circuit 17-1 and a write instruction switch 17-2; a channel memory 19-1 storing write addresses for the memory 16; an incrementor 19-2 for incrementing the content of the channel memory by +1; a memory channel read circuit 19-3 for reading the content of the channel memory 19-1; a memory channel read instruction switch 19-4; an AND gate 19-5 for supplying the output from the instruction switch 19-4 to the channel memory read circuit 19-3; and an address set circuit 19-6 for appointing the address read out of the channel memory 19-1 to the memory 16. The latch output from the data latch circuit 13 is supplied to the memory comparator write circuit 15-1 and the memory write circuit 17-1, while the output from the AND gate 11-15 is supplied to the memory comparator write circuit 15-1 and an OR gate 19-7. The output of a write instruction switch 17-2 is applied to OR gate 19-7 and then the output of the OR gate is applied to a memory channel read circuit 19-3 and an incrementor 19-2.

For the read-out of the stored data from the memory 16, there are provided a memory access circuit 18-1, address set circuit and memory access instruction switch 18-3. The output of the memory access instruction switch 18-3 is applied to the memory access circuit 18-1, address set circuit 18-2, AND gate 18-4 and 20-1 and also inverter 20-2. The storage data which is read from the memory 16 by the memory access circuit 18-1 is applied to display means 14.

A clear switch 20-5 clears our the stored data in the channel memory 19-1 and the contents in the data latch circuit 13. The output of the clear switch 20-5 is applied to AND gate 20-1 and data latch circuit 13. The address data read out by the memory channel read circuit 19-3 is supplied to the data latch circuit 118 from which the latch output is supplied to the display 14 through a buffer circuit 119. The output from the inverter 20-2 is supplied to the AND gates 19-5 and 20-3, while the output from the AND gate 20-3 is supplied as a strobe pulse to the data latch circuit 118 and as a control signal to the buffer circuit 119. The output from the AND gate 20-3 is supplied as a control signal to the buffer circuit 117 via the inverter 20-4.

The instruction switches 15-2, 17-2, 18-3, 19-4 and 20-5 output either a high level output or a low level output in accordance with its switching operation.

Now in operation, the data received and MSK-demodulated at the armature wireless transceiver has a format shown in FIG. 1 described previously.

The data is subjected to wave-shaping and delay-detection at the amplifier 101, low-pass filter 2 and wave shaping circuit 103, and thereafter further subjected to wave-shaping at the low-pass filter 104 and wave shaping circuit 105 to supply it to the data latch circuit 106. The data outputted from the wave shaping circuit 105 is supplied to the clock pulse generator circuit 107 while in turn outputs clock pulses of 1200 Hz synchronizing in phase with the data transference speed to supply them as strobe pulses to the latch circuit 106. Thus, the data as supplied from the latch circuit 105 is latched at the data latch circuit 106. Since the AND gate 5-1 is controlled in an open state, the clock pulses from the clock pulse generator circuit 107 is supplied as a shift pulse to the shift register 401. Therefore, the latch output from the data latch circuit 106 is sequentially transferred in the shift register 4-1.

When the frame sync pulse is loaded in the shift register 4-1, the outputs of the Exclusive-OR circuits 4-2 to 4-12 and AND gate 4-17 are at high level to thereby made the flip-flop 4-18 set. As a result, the AND gate 5-1 is controlled in a close state to thereby intercept the supply of shift pulses to the shift register 4-1. On the other hand, since the flip-flop 4-18 is being set, the AND gate 5-2 is controlled in an open state. Therefore, the clock pulse from the clock pulse generator circuit 107 is supplied as a shift pulse to the shift register 6 via the clock switching circuit 109, so that the latch output from the data latch circuit 106 is sequentially transferred to the shift register 6. Consequently, the data following the frame sync data, i.e., the data starting with the digital code, is transferred to the shift register 6. The shift pulses to the shift register 6 are counted by the counter 108. Upon counting "212" by the counter 108 and in response to its output, the clock switching circuit 109 uses, instead of the clock pulse supplied from the clock pulse generator circuit 107 via the AND gate 5-2, the clock pulse from the clock pulse generator 110. At the time when the counter 108 counts "212", the shift register 6 stores therein all of the 212 bits including check bits as shown in FIG. 2 (digital code, idle channel frequency data, command, callsign data and check bits).

As the clock switching circuit 109 switches on the side of the clock pulse generator 110, the output clock pulse from the clock pulse generator 110 is supplied as a shift pulse to the shift register 6, concurrently with counting the output clock pulse by the counter 111. The count result is divided into half at the frequency divider 112.

In this case, if the time the counter 111 has not still counted up, the AND gates 113 and 114 are controlled in an open state. Therefore, in synchronization with the output pulse from the clock pulse generator 110 after subjected to frequency division by 2, the output from the Hagelbarger demodulator circuit 7 is written in the 14th bit of the shift register 6 to correct errors if any. The write operation is controlled by the pulses obtained by dividing the shift pulses by the factor 2 so that the write operation is effected only for the data bits among the 212 bits, thus performing the write operation 106 times. Upon completion of the 106 write operations, the data bits in the data stored in the shift register 6 are corrected. The corrected 212 bits are stored in the shift register 8 and the count value of the counter 111 is "212".

In response to the following output clock pulse from the clock pulse generator 110 via the AND gate 114, the content of the shift register 8 is sequentially supplied to the data latch circuit 15. In this case, since the data latch circuit 115 is supplied as a strobe pulse with the output pulse from the frequency divider 116, which divides the output clock pulses of the clock pulse generator 110 via the AND gate 110 into half, the data latch circuit 15 does not latch the check bits stored in the shift register 8 but it latches only the data bits and transferes them to the shift register 10. As a result, the shift register 10 stores the digital code, idle channel frequency data, command, and callsign data in this order as seen from the right in FIG. 6. At the end of this storage, the count value of the counter 111 shows "424".

Thereafter, the AND gates 113 and 114 are controlled in a close state, and the shift register 10 holds the 100 bits composed of the digital code, idle channel frequency data, command, and callsign data. Although the number of data bits is 106 as considered from 212/2 = 106, the first 6 bits are out of the shift register 10 which have been used in correcting errors.

The digital data, idle channel frequency data and command all stored in the shift register 10 are supplied to the BCD comparator circuits 11-1 to 11-13 where they are checked as to their BCDs (0 to 9) or the command is checked if it is "00". As to the callsign data, it is supplied to the ASCII comparator circuits 12-1 to 12-6 where the data is checked as to their ASCII codes of 0 to 9 and A to Z. If the check for all of the data becomes valid, then the output of the AND gate 11-14 turns to a high level. Until this time, the count value of the counter 111 has counted up "424", the AND gate 11-15 is controlled in an open state, and the lower 48 bits in the shift register 10 are latched at the data latch circuit 13 in response to the output from the AND gate 11-15 via the AND gate 11-14, to thereby supply the lower 48 bits to the display 14 through the buffer circuit 117.

The latch output from the data latch circuit 13 and through the buffer circuit 117 is decoded by a decoder in the display 14 for display of the callsign on the display 14.

The lower 48 bits in the shift register 10 are also loaded in parallel to the shift register 15. The flip-flop 118 is set by the output from the AND gate 11-15 through the AND gate 11-14, and the output of the flip-flop 118 opens the AND gate 16. Therefore, the callsign data stored in the shift register 15 is sequentially supplied to the AND gate 19 in serial form in response to the output clock pulse from the clock pulse generator 17. If the control signal is a low level signal, then the AND gates 18 and 19 are controlled in an open state so that the clock pulse is outputted from the AND gate 18, and the callsign data from the AND gate 19.

Every circuits are initialized thereafter to stand by the reception of the next data. Therefore, every time the data is received, the callsign can be displayed.

Referring further to FIG. 7, if the switch 15-2 is at such a position as producing therefrom a high level output, then the memory comparator write instruction is enabled. In this case, the memory comparator write circuit 15-1 upon reception of the output from the AND gate 11-15 compares the data stored in the memory 16 with the latch output from the data latch circuit 13. It is checked whether the identical data to the latch output in the data latch circuit 13 is stored in the memory 16 or not. If there is no identical data, the latch output from the data latch circuit 13 is write in the memory 16.

Instead of the switch 15-2, if the switch 17-2 is at such a position as producing a high level output, then this is the case a mere write instruction is enabled. In this case, the above comparison is not carried out but the latch output from the data latch circuit 13 is directly written in the memory 16.

In both comparison write operation and mere write operation, the OR gate 19-7 retains a high level output in response to the output from the AND gate 11-15 or the high level output from the switch 17-2. Therefore, the address data is read out of the channel memory 19-1 by way of the memory channel read circuit 19-3 and supplied to the address set circuit 19-6. Consequently, the write address is the next address of the address where the last data is stored. In addition, the incrementor 19-2 adds "+1" to the stored content of the channel memory 19-1 to renew its content to the succeeding write address for the preparation of the next write operation.

Next, if the switch 19-4 is at such a position as producing therefrom a high level output and the switch 18-3 is at such a position as producing therefrom a low level output, then the AND gate 19-5 is in an open state to output a high level signal. Therefore, the memory channel read circuit 19-3 reads from the channel memory 19-1 the address data where the next data is written. In this case, since the AND gate 20-3 also outputs a high level signal similarly to the AND gate 19-5, the address data for the next data write is latched by way of the channel memory 19-1 at the data latch circuit 118 and displayed on the display 14 via the buffer circuit 119. In this case, the buffer circuit 117 is controlled in a disable condition and the buffer circuit 119 is controlled in an enable condition, respectively in response to the output from the AND gate 20-3.

Alternatively, if the switch 18-3 is turned so as to produce therefrom a high level output, then the memory access circuit 18-1 is operated, while at the same time the address set circuit 18-2 is cleared. In this condition, each time the output from the switch 19-4 is turned to a high level, the output from the AND gate 18-4 is turned to a high level, thereby enabling increment of the address assignment by the address set circuit 18-2. Thus, it is possible to sequentially read the stored data in the memory 16 i.e., the stored callsign data, in the order starting with the callsign data stored at the top address, thereby enabling sequential display of callsigns on the display 14 via the buffer circuit 117. In this case, since the AND gates 19-5 and 20-3 are closed due to the output from the inverter 20-2, the switch 19-4 does not operate to read the address data in the channel memory 19-1 and display the data on the display 14.

If the output from the switch 20-5 is turned to a high level, the latch data in the data latch circuit 13 is made clear. Further, while the switch 18-3 is at such a position as producing therefrom a high level output, the contents of the memory 16 and the channel memory 19-1 are cleared. Thereafter, every circuits are initialized to prepare for the next data reception so that each time the data is received the callsign can be displayed.

We claim:

1. A callsign display device which displays a callsign by receiving a data Hagelbarger-coded and including a frame sync data and at least a callsign data following said frame sync data comprising:
   a frame sync data detector circuit for detecting a supplied frame sync data;
   a first shift register to which said data Hagelbarger-coded and following said frame sync data is supplied;

an input switching circuit for introducing to said first shift register said data Hagelbarger-coded and following said frame sync data in response to the output from said frame sync data detector circuit;

a decoding circuit for decoding in cooperative association with said first shift register said data Hagelbarger-coded and following said frame sync data;

a second shift register which is supplied with the decoded data from said first shift register;

a third shift register which is supplied only with data bits in said second shift register;

a data latch circuit for latching a callsign data in said third shift register; and a display for decoding and displaying the content of said data latch circuit.

2. A callsign display device according to claim 1 further comprising; a fourth shift register in which said callsign data in said third shift register is loaded and outputted as a serial data.

3. A callsign display device according to claim 1 further comprising; storage means for storing the output of said data latch circuit and reading and displaying said stored data on said display.

4. A callsign display device which display a callsign by receiving a data sequence which includes a frame sync data and a Hagelbarger-coded data following said frame sync data, the Hagelbarger-coded data including at least a callsign data, comprising:

a first detector (e.g. 4) for detecting a supplied frame sync data;

an input switching circuit (e.g. 5) in response to the frame sync data detection in said first detector circuit for extracting said Hagelbarger-coded data out of said data sequence;

a decoding circuit (e.g. 6 and 7) for decoding the extracted Hagelbarger-coded data;

a register (e.g. 10) for storing the decoded Hagelbarger-coded data;

a second detector (e.g. 12) for detecting whether or not part of the decoded Hagelbarger-coded data stored in said register is the callsign data; and a display (e.g. 13 and 14) in response to the callsign data detection for displaying the callsign data of said decoded Hagelbarger-coded data stored in said register as callsign.

5. A callsign display device according to claim 4 further comprising means (e.g. 15, 16, 17, 18, 19, 20) for converting the callsign data in said decoded Hagelbarger-coded data stored in said register into a serial data.

6. A callsign display device according to claim 4 further comprising means (e.g. 16) for storing the callsign data.

7. A callsign display device which displays a callsign by receiving a data sequence which includes a frame sync data and a message data following said frame sync data, the message data including at least a callsign data, comprising:

a first detector for detecting a supplied frame sync data;

an input switching circuit in response to the frame sync data detection in said first detector for extracting said message data out of said data sequence;

a register for storing the extracted message data;

a second detector for detecting whether or not part of the message data stored in said register is the callsign data; and a display in response to the callsign data detection for displaying the callsign data of said message data stored in said register as a callsign;

a memory for storing callsign data;

a comparator for examining whether or not the callsign data stored in said register is equal to any one of the callsign data stored in said memory; and a memory input circuit in response to the examination result that the callsign data stored in said register is not equal to any one of the callsign data stored in said memory for additionally writing the callsign data stored in said register into said memory.

8. A callsign display device according to claim 7 wherein said display displays the callsign data read out from said memory.

9. A callsign display according to claim 8 further comprising a second memory for storing addresses of store locations of said memory, wherein said display displays a callsign at the store location specified by one of the addresses stored in said second memory.

* * * * *